US012646778B2

(12) United States Patent
Jin et al.

(10) Patent No.: US 12,646,778 B2
(45) Date of Patent: Jun. 2, 2026

(54) BATTERY MODULE HAVING PLURALITY OF CYLINDRICAL BATTERY CELLS, BATTERY PACK COMPRISING SAME, AND AUTOMOBILE

(71) Applicant: LG Energy Solution, Ltd., Seoul (KR)

(72) Inventors: Hee-Jun Jin, Daejeon (KR); Jung-Hoon Lee, Daejeon (KR); Kyung-Mo Kim, Daejeon (KR); Jeong-O Mun, Daejeon (KR); Jin-Yong Park, Daejeon (KR); Jhin-Ha Park, Daejeon (KR); Ho-June Chi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 573 days.

(21) Appl. No.: 17/628,276

(22) PCT Filed: Jul. 13, 2020

(86) PCT No.: PCT/KR2020/009223
§ 371 (c)(1),
(2) Date: Jan. 19, 2022

(87) PCT Pub. No.: WO2021/025313
PCT Pub. Date: Feb. 11, 2021

(65) Prior Publication Data
US 2022/0376337 A1 Nov. 24, 2022

(30) Foreign Application Priority Data
Aug. 5, 2019 (KR) ........................ 10-2019-0095074

(51) Int. Cl.
*H01M 50/213* (2021.01)
*H01M 10/613* (2014.01)
(Continued)

(52) U.S. Cl.
CPC ....... *H01M 50/213* (2021.01); *H01M 10/613* (2015.04); *H01M 10/625* (2015.04);
(Continued)

(58) Field of Classification Search
None
See application file for complete search history.

(56) References Cited

U.S. PATENT DOCUMENTS

| | | | |
|---|---|---|---|
| 10,050,245 B2 | 8/2018 | Chatroux et al. | |
| 2005/0031933 A1* | 2/2005 | Blunk ................. | H01M 8/0206 |
| | | | 429/535 |

(Continued)

FOREIGN PATENT DOCUMENTS

| | | |
|---|---|---|
| DE | 102018009445 A1 | 6/2019 |
| EP | 3007247 A1 | 4/2016 |

(Continued)

OTHER PUBLICATIONS

Battery University, BU—301a: Types of Battery Cells , Apr. 24, 2019 (Year: 2019).*

(Continued)

*Primary Examiner* — Mary Grace Byram
(74) *Attorney, Agent, or Firm* — Lerner David LLP

(57) ABSTRACT

Disclosed is a battery module with improved energy density and cooling efficiency. To achieve the object, the battery module according to the present disclosure includes a plurality of cylindrical battery cells electrically connected to each other and arranged in a horizontal direction, an upper frame mounted on the plurality of cylindrical battery cells, and a lower frame mounted below the plurality of cylindrical battery cells, wherein a pressing portion is formed in any one of the upper frame and the lower frame to elastically press
(Continued)

the plurality of cylindrical battery cells in a horizontal inward direction for a dense arrangement of the plurality of cylindrical battery cells.

10 Claims, 13 Drawing Sheets

(51) Int. Cl.

| | | |
|---|---|---|
| *H01M 10/625* | (2014.01) |
| *H01M 10/643* | (2014.01) |
| *H01M 10/653* | (2014.01) |
| *H01M 10/658* | (2014.01) |
| *H01M 50/20* | (2021.01) |
| *H01M 50/244* | (2021.01) |
| *H01M 50/249* | (2021.01) |
| *H01M 50/262* | (2021.01) |
| *H01M 50/264* | (2021.01) |

(52) U.S. Cl.
CPC ....... *H01M 10/643* (2015.04); *H01M 10/653* (2015.04); *H01M 10/658* (2015.04); *H01M 50/20* (2021.01); *H01M 50/244* (2021.01); *H01M 50/249* (2021.01); *H01M 50/262* (2021.01); *H01M 50/264* (2021.01); *H01M 2220/20* (2013.01)

(56) References Cited

U.S. PATENT DOCUMENTS

| | | | | |
|---|---|---|---|---|
| 2008/0118823 | A1* | 5/2008 | Yang .................. | H01M 50/209 |
| | | | | 429/100 |
| 2010/0291428 | A1* | 11/2010 | Graban ............. | H01M 10/6551 |
| | | | | 429/120 |
| 2011/0262799 | A1 | 10/2011 | Kim | |
| 2012/0141852 | A1 | 6/2012 | Eberhard et al. | |
| 2012/0258335 | A1 | 10/2012 | Bae | |
| 2014/0045038 | A1 | 2/2014 | Kimura et al. | |
| 2014/0154545 | A1 | 6/2014 | Kishii et al. | |
| 2014/0283360 | A1 | 9/2014 | Kasuya et al. | |
| 2014/0287288 | A1 | 9/2014 | Takeda et al. | |
| 2014/0295239 | A1* | 10/2014 | Haug .................. | H01M 50/209 |
| | | | | 29/623.2 |
| 2015/0221922 | A1 | 8/2015 | Kim et al. | |
| 2016/0133904 | A1* | 5/2016 | Ogawa ................ | H01M 50/213 |
| | | | | 429/156 |
| 2016/0172642 | A1* | 6/2016 | Hughes ............... | H01M 50/227 |
| | | | | 429/130 |
| 2017/0047572 | A1 | 2/2017 | Biskup et al. | |
| 2018/0086472 | A1* | 3/2018 | Gore .................. | H01M 50/284 |
| 2018/0316074 | A1 | 11/2018 | Kreisel et al. | |
| 2018/0366701 | A1 | 12/2018 | Morimitsu et al. | |
| 2020/0127255 | A1* | 4/2020 | Moon .............. | H01M 10/6568 |
| 2020/0194853 | A1 | 6/2020 | Yoo et al. | |
| 2020/0220132 | A1* | 7/2020 | Bourke .................. | B60L 58/25 |

FOREIGN PATENT DOCUMENTS

| | | | |
|---|---|---|---|
| JP | 2004164981 A | 6/2004 |
| JP | 2009507342 A | 2/2009 |
| JP | 2014182965 A | 9/2014 |
| JP | 2014186806 A | 10/2014 |
| JP | 2018185961 A | 11/2018 |
| JP | 20198887 A | 1/2019 |
| KR | 101108192 B1 | 2/2012 |
| KR | 101256075 B1 | 4/2013 |
| KR | 20130133855 A | 12/2013 |
| KR | 20140128844 A | 11/2014 |
| KR | 20180068993 A | 6/2018 |
| KR | 20180129115 A | 12/2018 |
| KR | 20190047499 A | 5/2019 |
| WO | 2007030154 A1 | 3/2007 |
| WO | 2013018331 A1 | 2/2013 |
| WO | 2019083177 A1 | 5/2019 |

OTHER PUBLICATIONS

International Search Report for PCT/KR2020/009223 dated Oct. 22, 2020. 3 pgs.
Extended European Search Report including Written Opinion for Application No. 20850443.1 dated Jul. 20, 2023, pp. 1-6.

* cited by examiner

BATTERY MODULE HAVING PLURALITY OF CYLINDRICAL BATTERY CELLS, BATTERY PACK COMPRISING SAME, AND AUTOMOBILE

CROSS-REFERENCE TO RELATED APPLICATIONS

The present application is a national stage entry under 35 U.S.C. § 371 of International Patent Application No. PCT/KR2020/009223, filed on Jul. 13, 2020, published in Korean, which claims priority to Korean Patent Application No. 10-2019-0095074, filed on Aug. 5, 2019, the entire contents of which are hereby incorporated by reference herein.

TECHNICAL FIELD

The present disclosure relates to a battery module comprising a plurality of cylindrical battery cells, a battery pack comprising the same and a vehicle, and more particularly, to a battery module with improved energy density and cooling efficiency, a battery pack comprising the same and a vehicle.

BACKGROUND ART

Due to their high applicability to various products and electrical properties such as a high energy density, secondary batteries are not only applied to portable electronic devices, but also Electric Vehicles (EVs), Hybrid Electric Vehicles (HEVs) or energy storage systems that are driven by an electric driving source.

Secondary batteries are gaining attention for their advantage of remarkably reducing the use of fossil fuels and not generating by-products from the use of energy, making them a new eco-friendly and energy efficient source of energy.

A battery pack used for electric vehicles includes a plurality of battery modules connected to each other, each battery module including a plurality of battery cells, to obtain high output. Each battery cell includes an electrode assembly including positive and negative electrode current collectors, a separator, an active material and an electrolyte solution, and can repeatedly recharged by electrochemical reactions between the components.

In an example, a conventional battery module includes a plurality of cylindrical battery cells and a module housing to receive the cylindrical battery cells therein. In this instance, in general, the plurality of cylindrical battery cells are spaced a predetermined distance apart from each other. There is a limitation in increasing the energy density of the battery module due to a gap (a dead space) between the plurality of cylindrical battery cells. As the energy capacity of the battery module increases, the spatial utility decreases due to the gap.

Moreover, the gap between the plurality of cylindrical battery cells is filled with air, and the air exerts a heat simulation effect, failing to dissipate heat at the center of the arrangement of the plurality of cylindrical battery cells. Accordingly, a thermal imbalance between the plurality of cylindrical battery cells occurs, which accelerates the degradation of some battery cells and reduces the life of the battery module.

DISCLOSURE

Technical Problem

The present disclosure is designed to solve the above-described problem, and therefore the present disclosure is directed to providing a battery module with increased energy density and cooling efficiency, a battery pack comprising the same and a vehicle.

These and other objects and advantages of the present disclosure can be understood by the following description, and will be apparent from the embodiments of the present disclosure. In addition, it will be readily appreciated that the objects and advantages of the present disclosure can be realized by means and combinations thereof.

Technical Solution

To achieve the above-described object, the battery module according to the present disclosure includes a plurality of cylindrical battery cells electrically connected to each other and arranged in a horizontal direction, an upper frame mounted on the plurality of cylindrical battery cells, and a lower frame mounted below the plurality of cylindrical battery cells, wherein a pressing portion is formed in any one of the upper frame and the lower frame to elastically press the plurality of cylindrical battery cells in a horizontal inward direction for a dense arrangement of the plurality of cylindrical battery cells.

Additionally, the pressing portion may have press protrusions disposed at an outer periphery of each of the upper frame and the lower frame and extending in the horizontal inward direction to press a cylindrical battery cell disposed at an outermost side among the plurality of cylindrical battery cells.

Additionally, at least one of the upper frame or the lower frame may have a plurality of fixing protrusions on an inner surface to support a horizontal side of each of the plurality of cylindrical battery cells to arrange each of the plurality of cylindrical battery cells, the fixing protrusions arranged between the plurality of cylindrical battery cells, each fixing protrusion having a triangular prism shape, and Additionally, the plurality of fixing protrusions may have a spacing between that is open for contact between one of the plurality of cylindrical battery cells and its adjacent cylindrical battery cell.

Additionally, each of the plurality of cylindrical battery cells may include a battery can to receive an electrolyte solution and an electrode assembly and a top cap mounted on the battery can, and the upper frame may have at least one connection hole that is open to expose the top of the battery can of the plurality of cylindrical battery cells and the top cap.

Additionally, the lower frame may have a plurality of openings that is open to expose a lower surface of the battery can of each of the plurality of cylindrical battery cells, and a thermally conducting material configured to cover at least part of the lower surface of the battery can of the plurality of cylindrical battery cells may be added to the openings of the lower frame.

Additionally, an electrically conductive adhesive may be provided between the fixing protrusions of the upper frame and the fixing protrusions of the lower frame to electrically connect the plurality of cylindrical battery cells.

Additionally, the battery module may further include a heat shrinkable film or an insulating sheet to press an outer side surface of the plurality of cylindrical battery cells in an inward direction of the plurality of cylindrical battery cells to bring the plurality of cylindrical battery cells in close contact.

Additionally, an elastic sheet configured to press the outer side surface of the plurality of cylindrical battery cells inward of the plurality of cylindrical battery cells may be added to an inner surface of the insulating sheet in contact with the plurality of cylindrical battery cells.

To achieve the above-described object, a battery pack according to the present disclosure includes at least one battery module.

To achieve the above-described object, a vehicle according to the present disclosure includes the battery pack according to the present disclosure.

Advantageous Effects

According to an aspect of the present disclosure, the battery module of the present disclosure may include the pressing portion configured to elastically press battery cells in each of the upper frame and the lower frame, to minimize the gap between the plurality of cylindrical battery cells, thereby receiving a larger number of cylindrical battery cells in the same space, and thus it is possible to effectively increase the energy density of the battery module.

According to this aspect of the present disclosure, the present disclosure includes the press protrusions extending in the horizontal inward direction to press the cylindrical battery cell disposed at the outermost side in the horizontal direction among the plurality of cylindrical battery cells along the outer periphery of the upper frame and the lower frame, to apply a suitable pressing force to arrange the plurality of cylindrical battery cells densely in the horizontal inward direction and fix the arrangement of the plurality of cylindrical battery cells by the upper frame.

According to another aspect of the present disclosure, when a thermal conducting material configured to cover at least part of the lower surface of the battery can of each of the plurality of cylindrical battery cells is added to the openings of the lower frame, heat may be transferred to the outside by thermal conduction through direct contact with the lower surface of the cylindrical battery cells from which heat is generated while the battery module is in use, thereby increasing the cooling efficiency of the battery module.

According to this aspect of the present disclosure, an electrically conductive adhesive is added between the fixing protrusions of the upper frame and the fixing protrusions of the lower frame to electrically connect the plurality of cylindrical battery cells, to complement the electrical connection of the densely arranged battery cells more perfectly.

Moreover, the adhesive fills a predetermined space formed between the fixing protrusions of the upper frame and the fixing protrusions of the lower frame, to solve the problem with the reduced cooling efficiency of the battery module caused by the heat insulation effect of air in an empty space between the plurality of cylindrical battery cells.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

Figure 1:
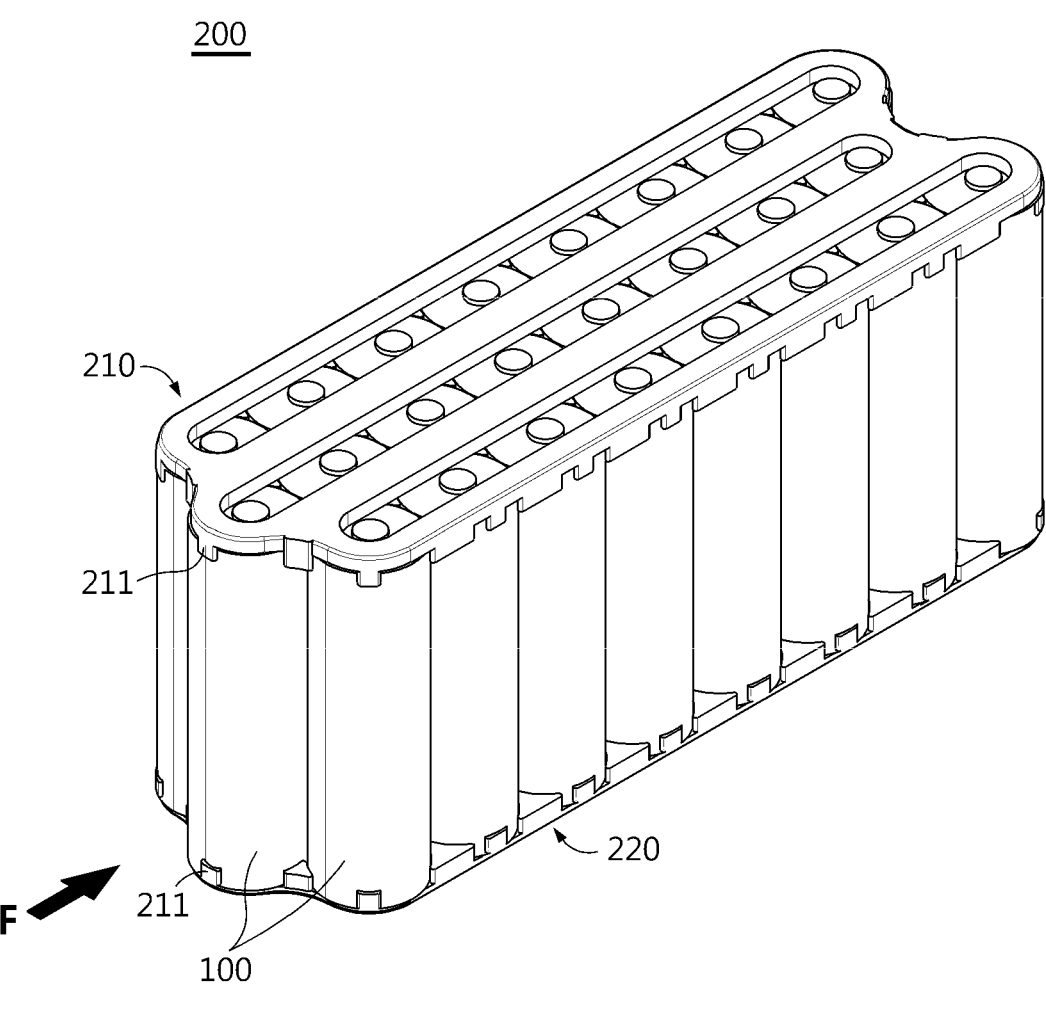
FIG. 1 is a schematic perspective view of a battery module according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
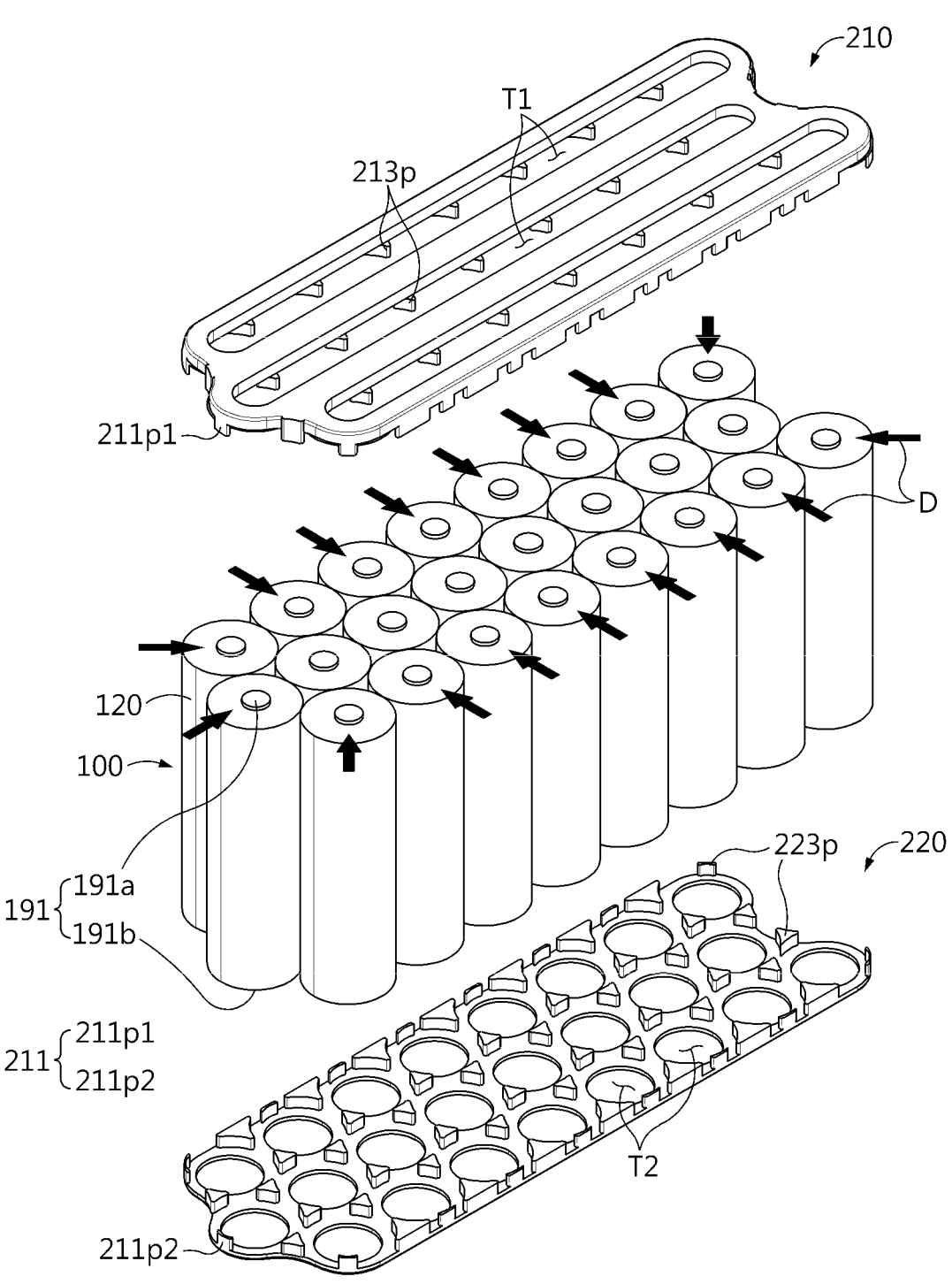
FIG. 2 is a schematic exploded perspective view of a battery module according to an embodiment of the present disclosure.
Figure 3:
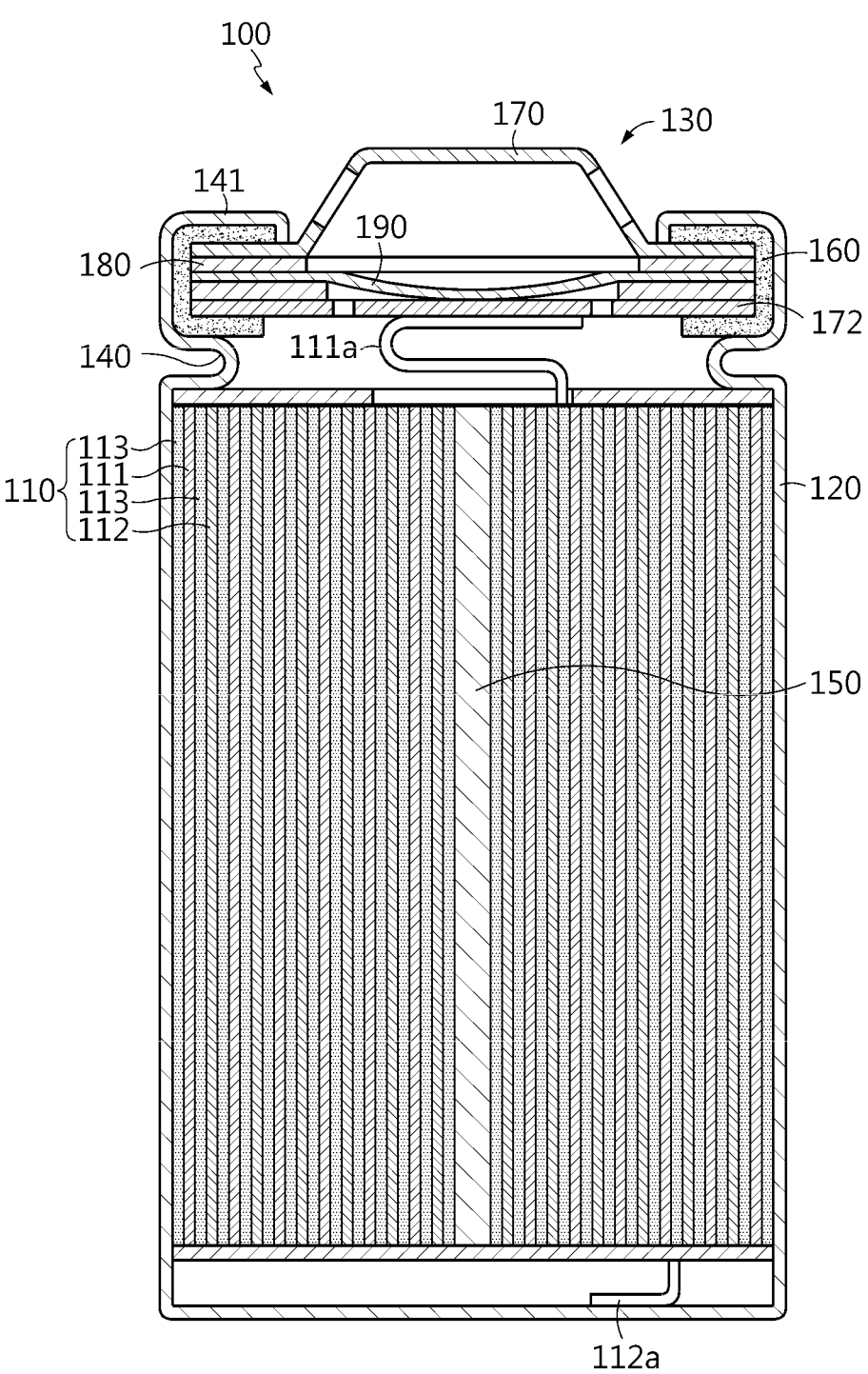
FIG. 3 is a schematic vertical cross-sectional view of a cylindrical battery cell of a battery module according to an embodiment of the present disclosure.

FIG. 1 is a schematic perspective view of a battery module according to an embodiment of the present disclosure. FIG. 2 is a schematic exploded perspective view of the battery module according to an embodiment of the present disclosure. FIG. 3 is a schematic vertical cross-sectional view of a cylindrical battery cell of the battery module according to an embodiment of the present disclosure.

Referring to FIGS. 1, 2 and 3, the battery module 200 according to an embodiment of the present disclosure includes a plurality of cylindrical battery cells 100, an upper frame 210 and a lower frame 220.

In detail, the plurality of cylindrical battery cells 100 may be electrically connected and arranged in the horizontal direction. Here, the horizontal direction refers to a direction parallel to the ground when the cylindrical battery cell 100 is placed on the ground, and may be at least one direction on the plane perpendicular to the vertical direction.

The cylindrical battery cell 100 includes a jelly-roll type electrode assembly 110, a center pin 150 inserted into the center of the electrode assembly 110, a battery can 120 to receive the electrode assembly 110 and the center pin 150, a cap assembly 130 coupled to the top opening of the battery can 120 to seal the battery can 120, and a gasket 160 interposed between the battery can 120 and the cap assembly. The battery can 120 receives the jelly-roll type electrode assembly 110 and an electrolyte solution (not shown) therein.

In this instance, to mount the cap assembly 130, the cylindrical battery cell 100 includes a beading portion 140 provided on top of the battery can 120 and a crimping portion 141 to seal the battery can 120.

The jelly-roll type electrode assembly 110 is wound in jelly-roll form with a separator 113 interposed between a positive electrode 111 and a negative electrode 112, the positive electrode 111 has a positive electrode tab 111*a* connected to the cap assembly 130, and the negative electrode 112 has a negative electrode tab 112*a* connected to the bottom of the battery can 120.

The cap assembly 130 includes a top cap 170 to seal an open end of the battery can 120 and forming a positive electrode terminal 191*a*, a Positive Temperature Coefficient (PTC) device 180 disposed in contact with the top cap 170 to increase the resistance to shut off the current when the temperature inside the battery rises, and a safety vent 190 electrically connected to the electrode assembly 110, with one surface in contact with the PTC device 180 and part of the other surface in contact with the gasket 160, to shut off the current and exhaust gas when the pressure inside the battery rises. Here, the cap assembly 130 may further include a current shut-off device 172 connected to the positive electrode tab 111*a*. The cap assembly 130 is coupled to the open end on top of the battery can 120 and mounted on the beading portion 140 of the battery can 120.

Here, the top cap 170 may serve as, for example, the positive electrode terminal 191*a*. The battery can 120 may serve as a negative electrode terminal 191*b*. In this instance, the battery can 120 and the top cap 170 may include an aluminum alloy.

The battery module 200 may include a connection element (not shown) configured to electrically connect the electrode terminals 191 of the plurality of cylindrical battery cells 100 in parallel or in series. The connection element may be, for example, a connection wire. The connection wire may be configured to be connected to the positive electrode terminal 191*a* and/or the negative electrode terminal 191*b* of the plurality of cylindrical battery cells 100. The connection wire may be, for example, alloys of nickel, copper and aluminum. However, the connection element is not necessarily limited to the connection wire shape, and may include metal plates of various shapes.

Figure 4:
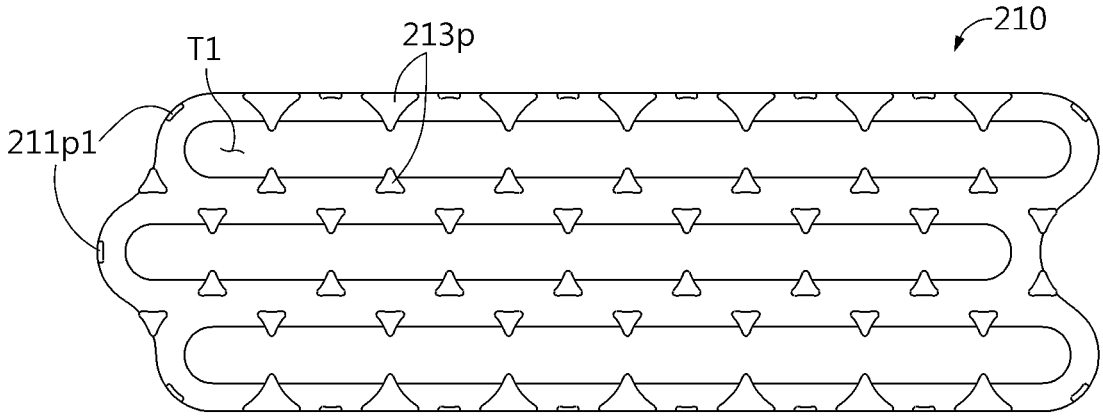
FIG. 4 is a schematic bottom view of some components of a battery module according to an embodiment of the present disclosure.

FIG. 4 is a schematic partial bottom view of some components of the battery module according to an embodiment of the present disclosure.

Figure 5:
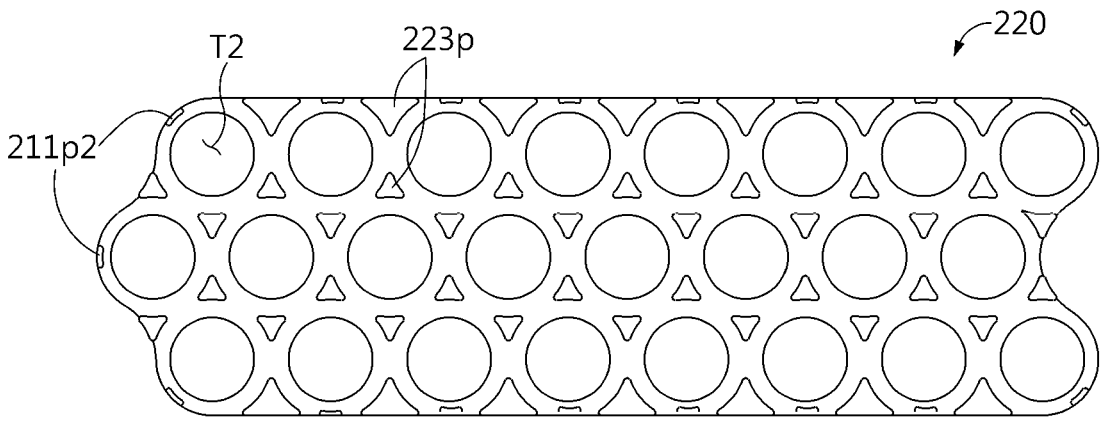
FIG. 5 is a schematic partial plane view of a battery module according to an embodiment of the present disclosure.

Referring to FIGS. 4 and 5 together with FIGS. 1 and 2, the upper frame 210 may be mounted on the plurality of cylindrical battery cells 100. Here, the upper frame 210 may include an electrically insulating material. For example, the electrically insulating material may be plastic having predetermined elasticity and electrical insulation. The plastic may be preferably polyvinyl chloride.

The upper frame 210 may be in the shape of a plate extending out in the horizontal direction as a whole. The upper frame 210 may have a size corresponding to the entire upper area of the plurality of cylindrical battery cells 100.

The lower frame 220 may be mounted below the plurality of cylindrical battery cells 100. Here, the lower frame 220 may include an electrically insulating material. For example, the electrically insulating material may be plastic having predetermined elasticity and electrical insulation. The plastic may be preferably polyvinyl chloride.

The lower frame 220 may be in the shape of a plate extending out in the horizontal direction as a whole. The lower frame 220 may have a size corresponding to the entire lower area of the plurality of cylindrical battery cells 100.

Any one of the upper frame 210 and the lower frame 220 may include a pressing portion 211. The pressing portion 211 may be configured to elastically press the plurality of cylindrical battery cells 100 in the horizontal inward direction for a dense arrangement of the plurality of cylindrical battery cells 100. Here the 'horizontal inward direction' refers to a direction toward the horizontal center of the plurality of cylindrical battery cells 100.

For example, as shown in FIG. 2, each of the upper frame 210 and the lower frame 220 may include the pressing portion 211 to elastically press the plurality of cylindrical battery cells 100 in the horizontal inward direction D for a dense arrangement of the plurality of cylindrical battery cells 100.

According to this configuration of the present disclosure, each of the upper frame 210 and the lower frame 220 includes the pressing portion 211 configured to elastically press the plurality of cylindrical battery cells 100 to minimize the gap between the plurality of cylindrical battery cells 100, thereby receiving a larger number of cylindrical battery cells 100 in the same space, and thus it is possible to effectively increase the energy density of the battery module 200.

Since there is no gap between the plurality of cylindrical battery cells 100 by the pressing portion 211, it is possible to reduce an increase in temperature difference between the cylindrical battery cell 100 disposed at the center of the plurality of cylindrical battery cells 100 and the cylindrical battery cell 100 disposed on the outer side due to the heat insulation effect of air in the space between the plurality of cylindrical battery cells 100. Accordingly, it is possible to prevent early degradation of some cylindrical battery cells, thereby increasing the service life of the battery module.

When the battery can 120 of the cylindrical battery cell 100 serves as the negative electrode terminal 191*b*, the plurality of cylindrical battery cells 100 may be connected in close contact with each other by the pressing portion 211. Accordingly, an electrical parallel connection may be established between the plurality of cylindrical battery cells 100. Accordingly, it is possible to eliminate a separate busbar configuration for electrically connecting the negative electrode terminal 191*b* of the plurality of cylindrical battery cells 100, thereby reducing the weight or the production cost of the battery module 200.

Referring back to FIG. 4, the upper frame 210 may have press protrusions 211*p*1 disposed on the outer periphery in the horizontal direction. The press protrusions 211*p*1 may be configured to press the cylindrical battery cell 100 disposed at the outermost side in the horizontal direction among the plurality of cylindrical battery cells 100. In more detail, the press protrusions 211*p*1 may extend in the horizontal inward direction. For example, as shown in FIG. 4, the upper frame 210 may have 17 press protrusions 211*p*1 on the outer periphery. Each of the 17 press protrusions 211*p*1 may be configured to press the cylindrical battery cell 100 disposed at the outermost side in the horizontal direction among the plurality of cylindrical battery cells 100 in the horizontal inward direction (D in FIG. 2). The press protrusions 211p1 may extend in the horizontal inward direction D to press the top of one cylindrical battery cell 100, and the horizontal inner side may have a curved shape.

According to this configuration of the present disclosure, the press protrusions 211p1 extending in the horizontal inward direction are provided on the outer periphery of the upper frame 210 to press the cylindrical battery cell 100 disposed at the outermost side in the horizontal direction among the plurality of cylindrical battery cells 100, to apply a suitable pressing force to arrange the plurality of cylindrical battery cells 100 densely in the horizontal inward direction and fix the arrangement of the plurality of cylindrical battery cells 100 by the upper frame 210.

Referring back to FIG. 5, the lower frame 220 may have press protrusions 211p2 disposed on the outer periphery in the horizontal direction. The press protrusions 211p2 may be configured to press the cylindrical battery cell 100 disposed at the outermost side in the horizontal direction among the plurality of cylindrical battery cells 100. In more detail, the press protrusions 211p2 may extend in the horizontal inward direction.

For example, as shown in FIG. 5, the lower frame 220 may have 17 press protrusions 211p2 on the outer periphery. Each of the 17 press protrusions 211p2 may be configured to press the cylindrical battery cell 100 disposed at the outermost side in the horizontal direction among the plurality of cylindrical battery cells 100 in the horizontal inward direction. The press protrusions 211p2 may extend in the horizontal inward direction to press the bottom of one cylindrical battery cell 100, and the horizontal inner surface may have a curved shape.

According to this configuration of the present disclosure, the pressing portion 211 has the press protrusions 211p2 disposed on the outer periphery of the lower frame 220 and extending in the horizontal inward direction to press the cylindrical battery cell 100 disposed at the outermost direction among the plurality of cylindrical battery cells 100 in the horizontal direction, to apply a suitable pressing force to arrange the plurality of cylindrical battery cells 100 densely in the horizontal inward direction and fix the arrangement of the plurality of cylindrical battery cells 100 disposed between the lower frame 220.

Referring back to FIG. 4, the upper frame 210 may have a plurality of fixing protrusions 213p to support the horizontal side of each of the plurality of cylindrical battery cells 100 to arrange each of the plurality of cylindrical battery cells 100.

The fixing protrusions 213p may be arranged between the plurality of cylindrical battery cells 100, and each may have a triangular prism shape. The triangular prism shape may have the horizontal side that is curved inwards for close contact between the fixing protrusions 213p and the outer surface of the cylindrical battery cells 100. The plurality of fixing protrusions 213p may be provided on the inner surface of the upper frame 210 in contact with the plurality of cylindrical battery cells 100.

For example, as shown in FIG. 4, the plurality of fixing protrusions 213p provided in the upper frame 210 may be disposed between the plurality of cylindrical battery cells 100. Some of the plurality of fixing protrusions 213p may be disposed between 3 cylindrical battery cells 100.

The plurality of fixing protrusions 213p may have a spacing between that is open for contact between one of the plurality of cylindrical battery cells 100 and its adjacent cylindrical battery cell 100. That is, the plurality of fixing protrusions 213p may be spaced apart from each other for contact between one cylindrical battery cell 100 and its adjacent cylindrical battery cell 100.

For example, as shown in FIG. 4, 32 fixing protrusions 213p of the upper frame 210 may be spaced a predetermined distance apart from each other for contact between one of the plurality of cylindrical battery cells 100 and its adjacent cylindrical battery cell 100. 2 adjacent fixing protrusions 213p may have a spacing between that is open for contact between one cylindrical battery cell 100 and its adjacent cylindrical battery cell 100.

Referring back to FIG. 5, the lower frame 220 may have a plurality of fixing protrusions 223p to support the horizontal side of each of the plurality of cylindrical battery cells 100 to arrange each of the plurality of cylindrical battery cells 100.

The fixing protrusions 223p may be arranged between the plurality of cylindrical battery cells 100, and each may have a triangular prism shape. The triangular prism shape may have the horizontal side that is curved in the inward direction for the fixing protrusions 223p to come into close contact with the outer surface of the cylindrical battery cells 100. The plurality of fixing protrusions 223p may be provided on the inner surface of the lower frame 220 in contact with the plurality of cylindrical battery cells 100.

For example, as shown in FIG. 5, the plurality of fixing protrusions 223p provided in the lower frame 220 may be disposed between the plurality of cylindrical battery cells 100. Some of the plurality of fixing protrusions 223p may be disposed between 3 cylindrical battery cells 100.

The plurality of fixing protrusions 223p may have a spacing between that is open for contact between one of the plurality of cylindrical battery cells 100 and its adjacent cylindrical battery cell 100. That is, the plurality of fixing protrusions 223p may be spaced apart from each other for contact between one cylindrical battery cell 100 and its adjacent battery cell 100.

For example, as shown in FIG. 5, 32 fixing protrusions 223p of the lower frame 220 may be spaced a predetermined distance apart from each other for contact between one of the plurality of cylindrical battery cells 100 and its adjacent cylindrical battery cell 100. 2 adjacent fixing protrusions 223p may have a spacing between that is open for contact between one cylindrical battery cell 100 and its adjacent cylindrical battery cell 100.

According to this configuration of the present disclosure, since the plurality of fixing protrusions 223p provided in each of the upper frame 210 and the lower frame 220 has a spacing between that is open for contact between one of the plurality of cylindrical battery cells 100 and its adjacent cylindrical battery cell 100, the plurality of cylindrical battery cells 100 may be arranged in contact with each other by the fixing protrusions 213p formed in the upper frame 210 and the lower frame 220, thereby simplifying the process of manufacturing the battery module 200.

Referring back to FIG. 2, the upper frame 210 may have at least one connection hole T1 that is open to expose the top of the battery can 120 of the plurality of cylindrical battery cells 100 and the top cap 170. For example, as shown in FIG. 2, the upper frame 210 may have 3 connection holes T1 extending out in the front-rear direction when viewed from the direction F of FIG. 1.

According to this configuration of the present disclosure, when the upper frame 210 has the at least one connection hole T1 to expose the top of the battery can 120 of the plurality of cylindrical battery cells 100 and the top cap 170, the top of the battery can 120 serving as the negative electrode terminal 191b and the top cap 170 serving as the positive electrode terminal 191*a* are exposed to the outside, thereby easily connecting the positive electrode terminal 191*a* and the negative electrode terminal 191*b* of the plurality of cylindrical battery cells 100 above through a separate connection element.

Figure 6:
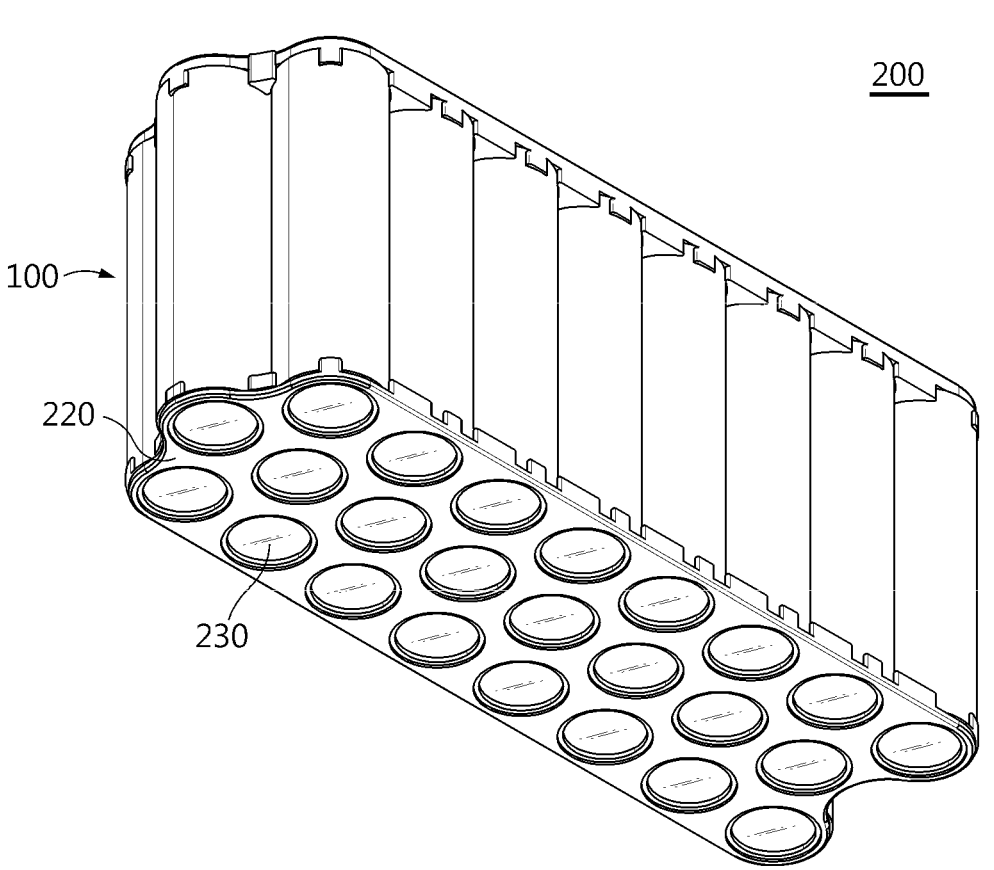
FIG. 6 is a schematic bottom perspective view of a battery module according to an embodiment of the present disclosure.

FIG. 6 is a schematic bottom perspective view of the battery module according to an embodiment of the present disclosure.

Referring to FIG. 6 together with FIG. 2, the lower frame 220 may have a plurality of openings T2 that is open to expose the lower surface of the battery can 120 of each of the plurality of cylindrical battery cells 100. For example, as shown in FIG. 2, the lower frame 220 may have 24 openings (T2 in FIG. 2) configured to expose the lower surface of each of 24 cylindrical battery cells 100 to the outside.

A thermally conducting material 230 configured to cover at least part of the lower surface of the battery can 120 of the plurality of cylindrical battery cells 100 may be added to the openings T2 of the lower frame 220. Here, the thermally conducting material 230 may include a material having high thermal conductivity. The thermally conducting material 230 may include an electrically insulating material. For example, the thermally conducting material 230 may be a solidified form of polymer resin or silicon-based resin having high thermal conductivity. In more detail, the polymer resin may be polysiloxane resin, polyamide resin, urethane resin or epoxy-based resin.

For example, as shown in FIGS. 2 and 6, the thermally conducting material 230 configured to cover at least part of the lower surface of the battery can 120 of the 24 cylindrical battery cells 100 may be added to each of the 24 openings T2 of the lower frame 220.

According to this configuration of the present disclosure, when the thermally conducting material 230 configured to cover at least part of the lower surface of the battery can 120 of each of the plurality of cylindrical battery cells 100 is added to the openings T2 of the lower frame 220, heat may be transferred to the outside by thermal conduction through direct contact with the lower surface of the cylindrical battery cell 100 from which heat is generated while the battery module 200 is in use, thereby increasing the cooling efficiency of the battery module 200.

Figure 7:
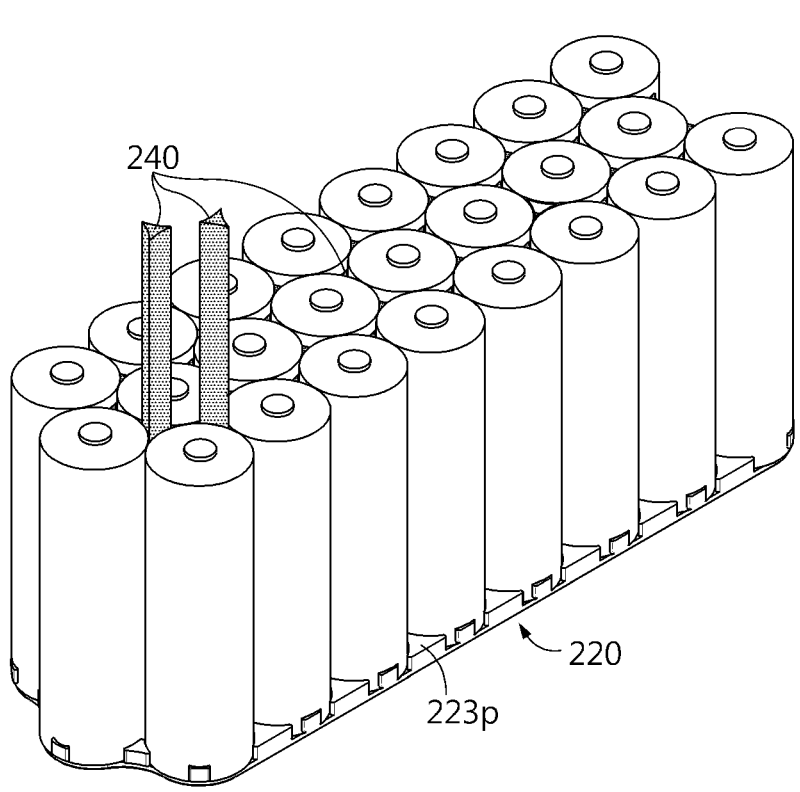
FIG. 7 is a schematic partial exploded perspective view of a battery module according to another embodiment of the present disclosure.

FIG. 7 is a schematic partial exploded perspective view of a battery module according to another embodiment of the present disclosure. Here, when compared with the battery module shown in FIG. 2, the battery module according to another embodiment shown in FIG. 7 further includes an adhesive 240, and the other configurations are the same.

Referring to FIG. 7 together with FIG. 2, the electrically conductive adhesive 240 may be provided between the fixing protrusions 213*p* of the upper frame 210 and the fixing protrusions 213*p* of the lower frame 220 to electrically connect the plurality of cylindrical battery cells 100. The electrically conductive adhesive 240 may be a mixture of acryl-, polyester-, polyurethane- or rubber-based resin and electrically conductive fillers. For example, the filler may be carbon nanotubes or a metal.

For example, as shown in FIGS. 2 and 7, a predetermined space may be formed between the fixing protrusions 213*p* of the upper frame 210 and the fixing protrusions 223*p* of the lower frame 220. The electrically conductive adhesive 240 may be added to the space to electrically connect the plurality of cylindrical battery cells 100.

According to this configuration of the present disclosure, the electrically conductive adhesive 240 may be added between the fixing protrusions 213*p* of the upper frame 210 and the fixing protrusions 223*p* of the lower frame 220 to electrically connect the plurality of cylindrical battery cells 100, thereby establishing an electrical connection of the plurality of densely arranged cylindrical battery cells 100 more perfectly. The adhesive 240 fills the predetermined space between the fixing protrusions 213*p* of the upper frame 210 and the fixing protrusions 223*p* of the lower frame 220, thereby solving the problem with the reduced cooling efficiency of the battery module 200 due to the heat insulation effect of air in the empty space between the plurality of cylindrical battery cells 100.

Figure 8:
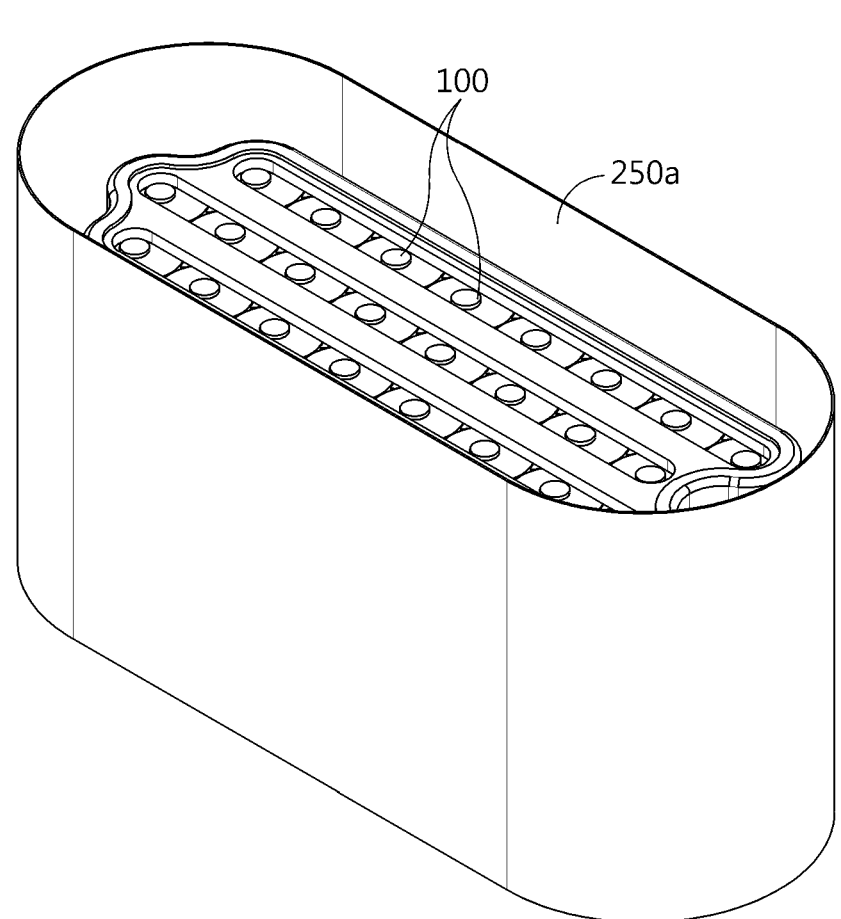
FIGS. 8 and 9 are schematic perspective views of a heat shrinkable film wrapped around a plurality of cylindrical battery cells in a battery module according to another embodiment of the present disclosure.
Figure 9:
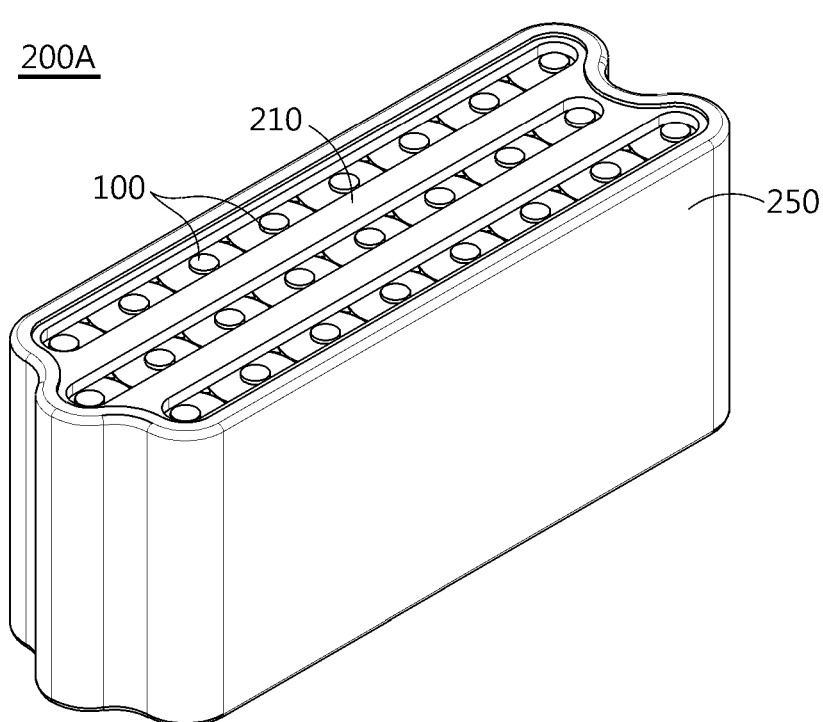

FIGS. 8 and 9 are schematic perspective views of a heat shrinkable film wrapped around the plurality of cylindrical battery cells in the battery module according to another embodiment of the present disclosure.

Referring to FIGS. 8 and 9, when compared with the battery module 200A of FIG. 1, the battery module 200A according to another embodiment of the present disclosure as shown in FIG. 9 may further include the heat shrinkable film 250. The components of the battery module 200A of FIG. 9 may be the same as those of the battery module 200 of FIG. 1. Accordingly, some of the components of the battery module 200A of FIG. 9 have been already described in the description of the battery module 200 of FIG. 1, and its detailed description is omitted herein below.

In detail, the heat shrinkable film 250 may shrink by heat. To this end, the heat shrinkable film 250 may include a heat shrinkable material of which volume reduces at a predetermined temperature. For example, the heat shrinkable film may be made using polyester-, polyolefin- or polyphenylene sulfide-based resin. In more detail, the heat shrinkable film 250 may include at least one of polystyrene, polyethylene terephthalate (PET), polyolefin, nylon, polyvinyl chloride (PVC) or polybutylene terephthalate (PBT).

The heat shrinkable film 250 may press the outer side surface of the plurality of cylindrical battery cells 100 in the inward direction of the plurality of cylindrical battery cells 100 to bring the plurality of cylindrical battery cells 100 into close contact. For example, FIG. 8 shows a heat shrinkable film 250*a* before heat shrinking. The heat shrinkable film 250*a* may have a strip shape with two lengthwise ends connected to each other. The strip-shaped heat shrinkable film 250*a* may be configured to receive 24 cylindrical battery cells 100 therein.

Subsequently, when the heat shrinkable film 250*a* is allowed to shrink using a heater that emits hot air of a predetermined temperature, the heat shrinkable film 250 may press the outer side surface of the 24 cylindrical battery cells 100 in the inward direction of the plurality of cylindrical battery cells 100 in the same way as the battery module 200A shown in FIG. 9.

The heat shrinkable film 250 may be configured to wrap part of the upper frame 210 and part of the lower frame 220. Accordingly, the heat shrinkable film 250 may bind the upper frame 210, the plurality of cylindrical battery cells 100 and the lower frame 220 together.

According to this configuration of the present disclosure, the battery module 200A according to another embodiment further includes the heat shrinkable film 250 to press the outer side surface of the plurality of cylindrical battery cells 100 in the inward direction of the plurality of cylindrical battery cells 100, thereby effectively arranging the plurality of cylindrical battery cells 100 densely (in close contact). Additionally, the heat shrinkable film 250 may serve as a module housing to fix the arrangement of the plurality of cylindrical battery cells 100 and protect the internal components from external impacts.

Figure 10:
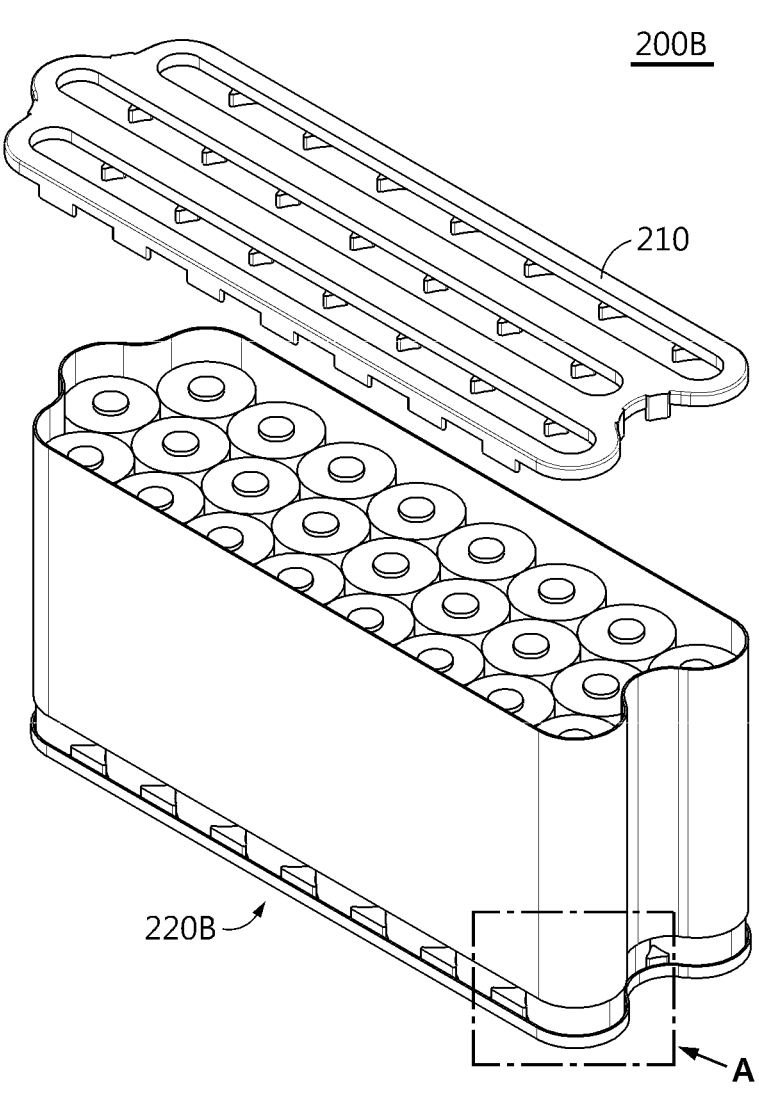
FIG. 10 is a schematic perspective view of a battery module according to still another embodiment of the present disclosure.
Figure 11:
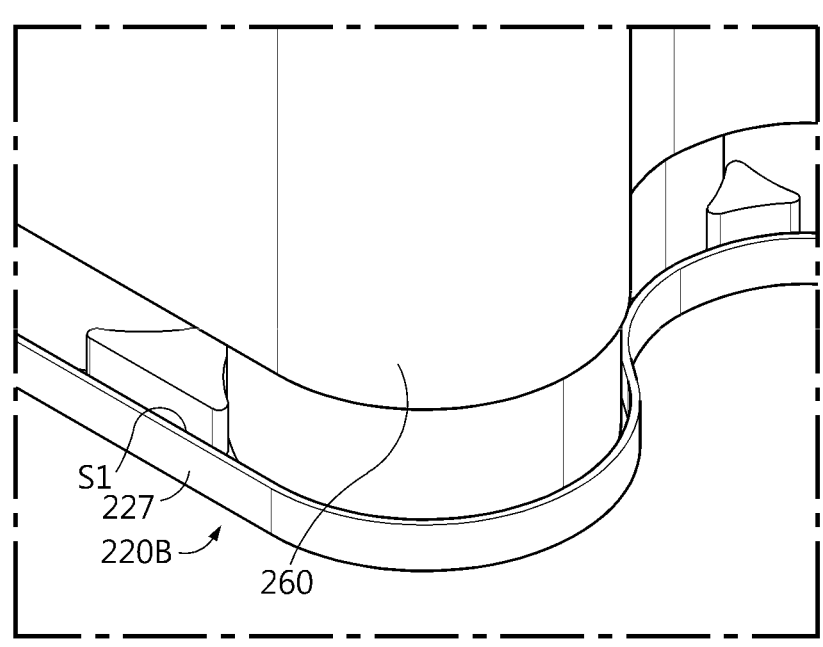
FIG. 11 is a schematic partial enlarged view of section B in FIG. 10.

FIG. 10 is a schematic perspective view of a battery module according to still another embodiment of the present disclosure. FIG. 11 is a schematic partial enlarged view of section B in FIG. 10.

Referring to FIGS. 10 and 11, when compared with the battery module 200 of FIG. 1, the battery module 200B of FIG. 10 may further include an electrically insulating sheet 260. The components of the battery module 200B of FIG. 10 may be the same as those of the battery module 200 of FIG. 1 except the configuration of a lower frame 220B. Accordingly, the components of the battery module 200B of FIG. 10 have been already described in the description of the battery module 200 of FIG. 1, and its detailed description is omitted herein below.

The insulating sheet 260 may be provided to press the outer side surface of the plurality of cylindrical battery cells 100 in the inward direction of the plurality of cylindrical battery cells 100 to bring the plurality of cylindrical battery cells 100 into close contact. The insulating sheet 260 may have a strip shape with two lengthwise ends connected to each other. The insulating sheet 260 may have a predetermined tension to press the outer side surface of the plurality of cylindrical battery cells 100 in the inward direction of the plurality of cylindrical battery cells 100. For example, the insulating sheet 260 may include polystyrene that is easily bendable and very flexible.

For example, as shown in FIG. 10, the insulating sheet 260 may press the outer side surface of 24 cylindrical battery cells 100 in the inward direction to bring the 24 cylindrical battery cells 100 into close contact.

The lower frame 220B of FIG. 10 may have linear slits Si into which the lower end of the insulating sheet 260 is inserted. The slits Si may extend along the horizontal outer periphery of the lower frame 220B. For example, as shown in FIG. 10, in the lower frame 220B, the linear slits Si into which the lower end of the insulating sheet 260 is inserted may extend along the inner surface of an outer sidewall 227 provided in the outer periphery.

According to this configuration of the present disclosure, the insulating sheet 260 may press the outer side surface of the plurality of cylindrical battery cells 100 in the inward direction of the plurality of cylindrical battery cells 100 to bring the plurality of cylindrical battery cells 100 into close contact, thereby arranging the plurality of cylindrical battery cells 100 more densely (in closer contact). The insulating sheet 260 may serve as a module housing to fix the arrangement of the plurality of cylindrical battery cells 100 and protect the internal components from external impacts.

Figure 12:
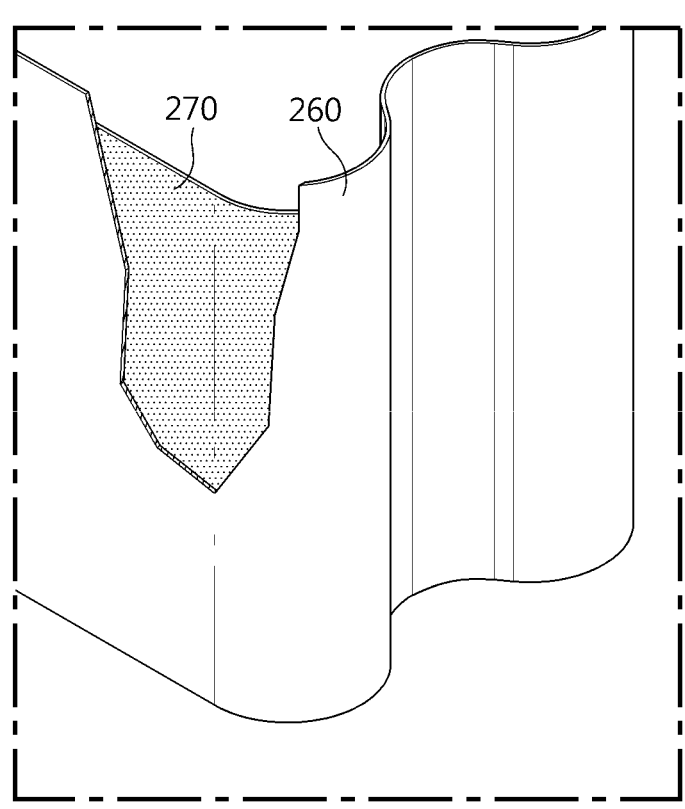
FIG. 12 is a schematic partial perspective view of an insulating sheet of a battery module according to still another embodiment of the present disclosure.

FIG. 12 is a schematic partial perspective view of the insulating sheet of the battery module according to still another embodiment of the present disclosure. Here, in FIG. 12, for convenience of description, part of the insulating sheet is removed to make the internal component visible.

Referring to FIG. 12 together with FIG. 10, an elastic sheet 270 configured to press the outer side surface of the plurality of cylindrical battery cells 100 inward of the plurality of cylindrical battery cells 100 may be added to the inner surface in contact with the plurality of cylindrical battery cells 100 of the insulating sheet 260. For example, the elastic sheet 270 may be a sponge having the restoring strength to expand when contracted by an external pressure.

For example, as shown in FIG. 12, the elastic sheet 270 extending along the lengthwise direction of the insulating sheet 260 may be attached to the inner surface of the insulating sheet 260 in contact with the plurality of cylindrical battery cells 100. According to this configuration of the present disclosure, the elastic sheet 270 may be provided on the inner surface of the insulating sheet 260 in contact with the plurality of cylindrical battery cells 100 to press the outer side surface of the plurality of cylindrical battery cells 100 inwards, thereby arranging the plurality of cylindrical battery cells 100 more densely (in closer contact).

Figure 13:
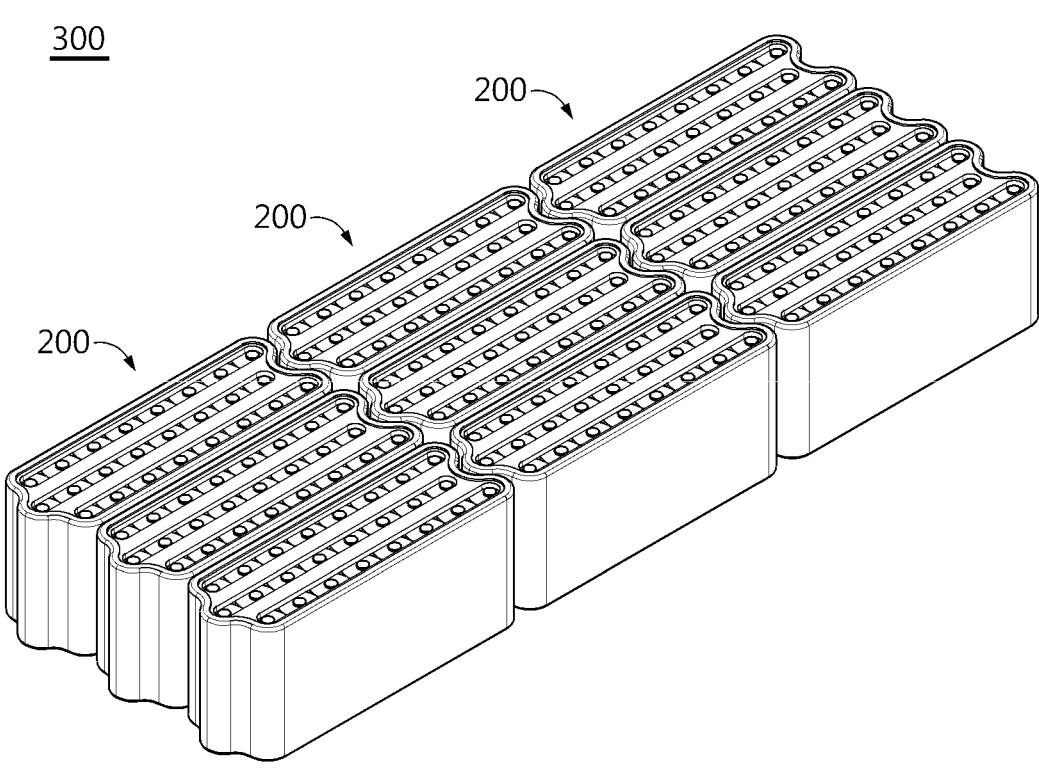
FIG. 13 is a schematic perspective view of a battery pack according to an embodiment of the present disclosure.

FIG. 13 is a schematic perspective view of a battery pack according to an embodiment of the present disclosure.

Referring to FIG. 13, the battery pack 300 according to an embodiment of the present disclosure may include at least one battery module 200. For example, as shown in FIG. 13, the battery pack 300 may include 9 battery modules 200 arranged in close contact.

In addition to the battery modules 200, the battery pack 300 according to the present disclosure may further include a pack case to receive the battery modules 200, and a variety of devices to control the charge/discharge of the battery modules 200, for example, a Battery Management System (BMS), a current sensor and a fuse. In this instance, each battery module 200 may have protrusions extending forwards at the front side and recesses sunken forwards at the rear side. The plurality of battery modules 200 may be arranged by coupling of the protrusions and recesses.

A vehicle (not shown) according to the present disclosure may include the battery pack 300. The vehicle may be, for example, an electric vehicle having an electric motor (not shown) using the battery pack 300 as a source of power.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DESCRIPTION OF REFERENCE NUMERALS

| | | |
|---|---|---|
| 200: | Battery module | 100: Cylindrical battery cell |
| 191, 191a, 191b: | Electrode terminal, | |
| | Positive electrode terminal, | |
| | Negative electrode terminal | |
| 120, 170: | Battery can, Top cap | |
| 210: | Upper frame | 220: Lower frame |
| 211: | Pressing portion | 211p1, 211p2: Press protrusion |
| 213p, 223p: | Fixing protrusion | T1, T2: Connection hole, Opening |
| 230: | Thermally conducting material | 240: Adhesive |

-continued

| | |
|---|---|
| 250: Heat shrinkable film | 260: Insulating sheet |
| 270: Elastic sheet | |
| S1: Slit | |
| 300: Battery pack | |

INDUSTRIAL APPLICABILITY

The present disclosure relates to a battery module comprising a plurality of cylindrical battery cells. In addition, the present disclosure can be used in the industry related to electronic devices and vehicles comprising the battery pack.

What is claimed is:

1. A battery module comprising:
a plurality of cylindrical battery cells electrically connected to each other in parallel and arranged adjacent to one another in a horizontal direction;
an upper frame mounted on upper ends of the plurality of cylindrical battery cells;
a lower frame mounted below lower ends of the plurality of cylindrical battery cells; and
an insulating sheet pressing an outer side surface of each of the plurality of cylindrical battery cells in an inward direction, so that the plurality of cylindrical battery cells contact one another,
wherein a pressing portion is formed in any one of the upper frame and the lower frame, the pressing portion elastically pressing outer ones of the plurality of cylindrical battery cells in a horizontal inward direction, resulting in a dense arrangement of the plurality of cylindrical battery cells,
wherein the upper frame and the lower frame each have a plurality of fixing protrusions on an inner surface thereof, the plurality of fixing protrusions each supporting a horizontal side of respective ones of the plurality of cylindrical battery cells to fix horizontal locations of each of the plurality of cylindrical battery cells, the fixing protrusions arranged between adjacent ones of the plurality of cylindrical battery cells, each fixing protrusion having a triangular prism shape, the plurality of fixing protrusions having open space therebetween, each of the plurality of cylindrical battery cells directly physically contacting an adjacent one of the cylindrical battery cells within the open space,
wherein the battery module has an electrically conductive adhesive that completely fills an entire space between the fixing protrusions of the upper frame and the fixing protrusions of the lower frame and between adjacent ones of the plurality of cylindrical battery cells to electrically connect the plurality of cylindrical battery cells to one another.

2. The battery module according to claim 1, wherein the pressing portion includes press protrusions disposed at an outer periphery of each of the upper frame and the lower frame and extending in the horizontal inward direction.

3. The battery module according to claim 1, wherein each of the plurality of cylindrical battery cells includes a battery can having an electrolyte solution and an electrode assembly therein, and a top cap mounted on the respective battery can, and
the upper frame has at least one connection hole extending therethrough, through which the top cap of the battery can of each of the plurality of cylindrical battery cells is exposed.

4. The battery module according to claim 3, wherein the lower frame has a plurality of openings through which a lower surface of the battery can of each of the plurality of cylindrical battery cells is exposed, respectively, and
the lower frame has a thermally conducting material covering at least part of the lower surface of the battery can of each of the plurality of cylindrical battery cells within the openings of the lower frame.

5. The battery module according to claim 1, further comprising an elastic sheet pressing the outer side surface of the plurality of cylindrical battery cells added to an inner surface of the insulating sheet, the elastic sheet being in contact with each of the plurality of cylindrical battery cells.

6. A battery pack comprising at least one battery module according to claim 1.

7. A vehicle comprising the battery pack according to claim 6.

8. The battery module according to claim 1, wherein the lower frame has linear slits configured to receive insertion of the insulating sheet therein.

9. The battery module according to claim 8, wherein a lower end of the insulating sheet is inserted into the linear slits.

10. The battery module according to claim 1, wherein each of the plurality of cylindrical battery cells directly physically contacts an adjacent one of the cylindrical battery cells within the open space at all times.

*   *   *   *   *